United States Patent
He et al.

(10) Patent No.: US 11,198,941 B2
(45) Date of Patent: Dec. 14, 2021

(54) METHODS FOR HYDROGEN GAS PRODUCTION THROUGH WATER ELECTROLYSIS

(71) Applicant: Battelle Energy Alliance, LLC, Idaho Falls, ID (US)

(72) Inventors: Ting He, Idaho Falls, ID (US); Dong Ding, Idaho Falls, ID (US); Wei Wu, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 47 days.

(21) Appl. No.: 16/483,631

(22) PCT Filed: Feb. 1, 2018

(86) PCT No.: PCT/US2018/016449
§ 371 (c)(1),
(2) Date: Aug. 5, 2019

(87) PCT Pub. No.: WO2018/144729
PCT Pub. Date: Aug. 9, 2018

(65) Prior Publication Data
US 2020/0123668 A1 Apr. 23, 2020

Related U.S. Application Data (60) Provisional application No. 62/454,318, filed on Feb. 3, 2017.

(51) Int. Cl.
*C25B 1/04* (2021.01)
*C25B 9/73* (2021.01)
(Continued)

(52) U.S. Cl.
CPC .............. *C25B 1/04* (2013.01); *C25B 1/042* (2021.01); *C25B 9/23* (2021.01); *C25B 9/73* (2021.01);
(Continued)

(58) Field of Classification Search
CPC ........ C25B 13/05; C25B 11/0773; C25B 1/04
See application file for complete search history.

(56) References Cited

U.S. PATENT DOCUMENTS

| 4,470,894 A | 9/1984 | Dyer |
| 7,125,621 B2 | 10/2006 | Haile et al. |

(Continued)

FOREIGN PATENT DOCUMENTS

JP 2015-147997 A 8/2015

OTHER PUBLICATIONS

Machine translation of JP2015-147997 of Asano et al (Year: 2015).*
(Continued)

*Primary Examiner* — Brian W Cohen
(74) *Attorney, Agent, or Firm* — TraskBritt (57) ABSTRACT

A method of producing hydrogen gas comprises introducing gaseous water to an electrolysis cell comprising a positive electrode, a negative electrode, and a proton conducting membrane between the positive electrode and the negative electrode. The proton conducting membrane comprises an electrolyte material having an ionic conductivity greater than or equal to about $10^{-2}$ S/cm at one or more temperatures within a range of from about 150° C. to about 650° C. The gaseous water is decomposed using the electrolysis cell. A hydrogen gas production system and an electrolysis cell are also described.

14 Claims, 5 Drawing Sheets

(51) Int. Cl.
  *C25B 9/23* (2021.01)
  *C25B 15/021* (2021.01)
  *C25B 1/042* (2021.01)
  *C25B 13/07* (2021.01)
  *C25B 11/047* (2021.01)

(52) U.S. Cl.
  CPC ............ *C25B 11/047* (2021.01); *C25B 13/07* (2021.01); *C25B 15/021* (2021.01)

(56) References Cited

U.S. PATENT DOCUMENTS

| | | | |
|---|---|---|---|
| 7,906,006 | B2 | 3/2011 | Irvine et al. |
| 8,012,380 | B2 | 9/2011 | Elangovan et al. |
| 8,993,200 | B2 | 3/2015 | Liu et al. |
| 2010/0196767 | A1* | 8/2010 | Sala .................... C25B 9/05 429/400 |
| 2010/0304272 | A1 | 12/2010 | Shukla et al. |
| 2013/0143142 | A1 | 6/2013 | Liu et al. |

OTHER PUBLICATIONS

Aili et al., "Phosphoric Acid Doped Membranes Based on Nation (Registered), PBI and Their Blends—Membrane Preparation, Characterization and Steam Electrolysis Testing," International Journal of Hydrogen Energy, vol. 36, (Apr. 20, 2011), p. 6985-6993.

Bi et al., "Steam Electrolysis by Solid Oxide Electrolysis Cells (SOECs) With Proton-Conducting Oxides," Chemistry Society Reviews, vol. 43, (Aug. 18, 2014), pp. 8255-8270.

Fabbri et al., "Design and Fabrication of a Chemically-Stable Proton Conductor Bilayer Electrolyte for Intermediate Temperature Solid Oxide Fuel Cells (IT-SOFCs)" Energy & Environmental Science, vol. 1, (Jun. 23, 2008), pp. 355-359.

Hong et al., "Toward the Rational Design of Non-Precious Transition Metal Oxides for Oxygen Electrocatalysis," Energy Environ. Sci., vol. 8, (2015), pp. 1404-1427.

International Search Report and Written Opinion received for PCT Patent Application No. PCT/US2018/016449, dated May 15, 2018, 12 pages.

Kukino et al., A New Proton-Conductive Electrolyte of $CsH_2PO_4$/$SiP_2O_7$ Composite for Use in Intermediate Temperature Fuel Cells, 1 page.

Phair et al., "Review of Proton Conductors for Hydrogen Separation," Ionics, vol. 12, (2006), pp. 103-115.

Suntivich et al., "A Perovskite Oxide Optimized for Oxygen Evolution Catalysis from Molecular Orbital Principles," Science, vol. 334, (Dec. 9, 2011), pp. 1383-1385.

Wattiaux et al., "Electrolytic Oxygen Evolution in Alkaline Medium on La1—SrxFeO3-y Perovskite-Related Ferrites," I. Electrochemical Study, vol. 134, No. 7, (Jul. 1987), pp. 1714-1718.

Xiao et al., "High-Temperature Polybenzimidazole Fuel Cell Membranes Via a Sol-Gel Process," Chemistry of Materials, vol. 17, (Sep. 21, 2005), pp. 5328-5333.

Zoulias et al., A Review on Water Electrolysis, (Jan. 2004) 18 Pages.

Zuo et al., "Ba (Zr0.1Ce0.7Y0.2) O3-(Delta) as an Electrolyte for Low-Temperature Solid-Oxide Fuel Cells," Advanced Materials, vol. 18, (Nov. 23, 2003), pp. 3318-3320.

\* cited by examiner

METHODS FOR HYDROGEN GAS PRODUCTION THROUGH WATER ELECTROLYSIS

CROSS-REFERENCE TO RELATED APPLICATIONS

This application is a national phase entry under 35 U.S.C. § 371 of International Patent Application PCT/US2018/016449, filed Feb. 1, 2018, designating the United States of America and published as International Patent Publication WO 2018/144729 A1 on Aug. 9, 2018, which claims the benefit of the filing date under Article 8 of the Patent Cooperation Treaty to U.S. Provisional Patent Application Ser. No. 62/454,318, filed Feb. 3, 2017, for "METHODS AND SYSTEMS FOR HYDROGEN GAS PRODUCTION THROUGH WATER ELECTROLYSIS, AND RELATED ELECTROLYSIS CELLS."

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

The disclosure, in various embodiments, relates to methods and systems for producing hydrogen gas through water electrolysis, and to related electrolysis cells and electrolysis apparatuses including the electrolysis cells.

BACKGROUND

Hydrogen gas is used in a wide variety of industrial applications, and the demand for hydrogen gas is increasing. One method of producing hydrogen gas is through water electrolysis. Water electrolysis refers to the decomposition (e.g., splitting) of water into oxygen gas and hydrogen gas through the application of electrical current to the water across electrodes of opposite polarity. Hydrogen gas is produced at the negative electrode (cathode) and oxygen gas is produced at the positive electrode (anode).

Various conventional methods of enhancing hydrogen gas production through water electrolysis have focused on improving water electrolysis reaction kinetics and thermodynamics through high temperature (e.g., greater than about 750° C.) processes, and/or on reducing the thermal energy required to facilitate water electrolysis through the use of low temperature processes (e.g., less than about 150° C.) and/or catalyst materials. However, conventional high temperature water electrolysis processes can result in undesirable energy (e.g., thermal energy) expenditures and/or cell degradation (e.g., thermal degradation), and conventional low temperature water electrolysis processes can suffer from poor reaction kinetics and/or the need to employ costly catalyst materials to improve the poor reaction kinetics.

It would be desirable to have new methods, systems, and apparatuses for producing hydrogen gas through water electrolysis. It would further be desirable if the new methods, systems, and apparatuses facilitated increased hydrogen gas production efficiency, increased operational life, and were relatively inexpensive and simple in operation.

BRIEF SUMMARY

Embodiments described herein include methods and systems for producing hydrogen gas through water electrolysis, and related electrolysis cells and electrolysis apparatuses including the electrolysis cells. In accordance with one embodiment described herein, a method of hydrogen gas comprises introducing gaseous water to an electrolysis cell comprising a positive electrode, a negative electrode, and a proton-conducting membrane between the positive electrode and the negative electrode. The proton-conducting membrane comprises an electrolyte material having an ionic conductivity greater than or equal to about $10^{-2}$ S/cm at one or more temperatures within a range of from about 150° C. to about 650° C. The gaseous water is decomposed using the electrolysis cell.

In additional embodiments, a hydrogen gas production system comprises a source of liquid water, a steam generator configured and positioned to receive a liquid water stream from the source of liquid water and to generate a gaseous water stream therefrom, and an electrolysis apparatus in fluid communication with the steam generator. The electrolysis apparatus comprises a housing structure configured and positioned to receive the gaseous water stream from the steam generator, and an electrolysis cell within an internal chamber of the housing structure. The electrolysis cell comprises a positive electrode, a negative electrode, and a proton-conducting membrane between the positive electrode and the negative electrode and comprising an electrolyte material having an ionic conductivity greater than or equal to about 10-2 S/cm at one or more temperatures within a range of from about 150° C. to about 650° C.

In further embodiments, an electrolysis cell comprises a positive electrode, a negative electrode, and a proton-conducting membrane between the positive electrode and the negative electrode and comprising an electrolyte material having an ionic conductivity greater than or equal to about $10^{-2}$ S/cm at one or more temperatures within a range of from about 150° C. to about 650° C.

DETAILED DESCRIPTION

Methods and systems for producing hydrogen gas ($H_{2(g)}$) through water electrolysis are disclosed, as are related electrolysis cells. In some embodiments, a method of producing $H_{2(g)}$ includes forming a gaseous water ($H_2O$) stream from a liquid $H_2O$ stream, and then directing the gaseous $H_2O$ stream into an electrolysis apparatus including an electrolysis cell therein. The electrolysis cell comprises electrodes having opposite polarity than each other, and a proton-conducting membrane between the electrodes. The proton-conducting membrane comprises an electrolyte material having an ionic conductivity greater than or equal to about $10^{-2}$ Siemens per centimeter (S/cm) at one or more temperatures within a range of from about 150° C. to about 650° C. Electrical current is applied to the gaseous $H_2O$ across the electrodes of the electrolysis cell at a temperature within the range of from about 150° C. to about 650° C. to decompose (e.g., split) the gaseous $H_2O$ into $H_{2(g)}$ and oxygen gas ($O_{2(g)}$). The methods, systems, and apparatuses of the disclosure may be more efficient (e.g., increasing $H_{2(g)}$ production efficiency; reducing equipment, material, and/or energy requirements; etc.), more durable, and/or less complicated as compared to conventional methods, conventional systems, and conventional apparatuses for producing $H_{2(g)}$ through $H_2O$ electrolysis.

The following description provides specific details, such as material compositions and processing conditions (e.g., temperatures, pressures, flow rates, etc.) in order to provide a thorough description of embodiments of the disclosure. However, a person of ordinary skill in the art will understand that the embodiments of the disclosure may be practiced without necessarily employing these specific details. Indeed, the embodiments of the disclosure may be practiced in conjunction with conventional systems and methods employed in the industry. In addition, only those process components and acts necessary to understand the embodiments of the present disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure. In addition, the drawings accompanying the disclosure are for illustrative purposes only, and are not meant to be actual views of any particular material, device, or system.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, material distribution, and arrangement of one or more of at least one structure and at least one apparatus facilitating operation of one or more of the structure and the apparatus in a pre-determined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

As used herein, the term "negative electrode" means and includes an electrode having a relatively lower electrode potential in an electrochemical cell (i.e., lower than the electrode potential in a positive electrode therein). Conversely, as used herein, the term "positive electrode" means and includes an electrode having a relatively higher electrode potential in an electrochemical cell (i.e., higher than the electrode potential in a negative electrode therein).

As used herein the term "electrolyte" means and includes an ionic conductor, which can be in a solid state, a liquid state, or a gas state (e.g., plasma).

As used herein, the term "compatible" means that a material does not undesirably react, decompose, or absorb another material, and also that the material does not undesirably impair the chemical and/or mechanical properties of the another material.

Figure 1:
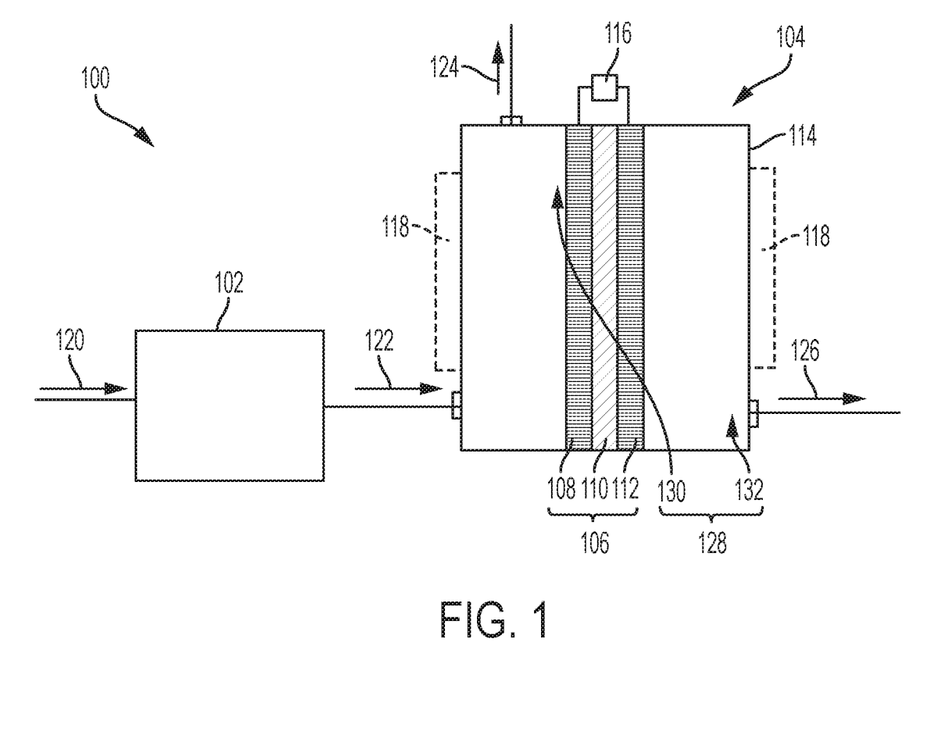
FIG. 1 is a simplified schematic view of a hydrogen gas production system, in accordance with an embodiment of the disclosure.

An embodiment of the disclosure will now be described with reference to FIG. 1, which schematically illustrates an $H_{2(g)}$ production system 100. The $H_{2(g)}$ production system 100 may be used to convert $H_2O$ into $H_{2(g)}$ and $O_{2(g)}$. As shown in FIG. 1, the $H_{2(g)}$ production system 100 may include at least one steam generator 102 and at least one electrolysis apparatus 104 in fluid communication with the steam generator 102. The electrolysis apparatus 104 includes a housing structure 114, and at least one electrolysis cell 106 contained within the housing structure 114. The electrolysis cell 106 is electrically connected (e.g., coupled) to a power source 116, and includes a positive electrode 108 (e.g., anode), a negative electrode 112 (e.g., cathode), and a proton-conducting membrane 110 between the positive electrode 108 and the negative electrode 112. As shown in FIG. 1, optionally, the $H_{2(g)}$ production system 100 may also include at least one heating apparatus 118 operatively associated with the electrolysis apparatus 104.

During use and operation, the $H_{2(g)}$ production system 100 converts a liquid $H_2O$ stream 120 into a gaseous $H_2O$ (e.g., steam) stream 122 within the steam generator 102, and then directs the gaseous $H_2O$ stream 122 into the electrolysis apparatus 104 to interact with the positive electrode 108 of the electrolysis cell 106. A potential difference (e.g., voltage) is applied between the positive electrode 108 and the negative electrode 112 of the electrolysis cell 106 by the power source 116 so that as the gaseous $H_2O$ interacts with the positive electrode 108, H atoms of the gaseous $H_2O$ release their electrons ($e^-$) to generate $O_{2(g)}$, hydrogen ions ($H^+$) (i.e., protons), and electrons (e) according to the following equation:

$$2H_2O_{(g)} \rightarrow O_{2(g)} + 4H^+ + 4e^- \qquad (1).$$

The generated $H^+$ permeate (e.g., diffuse) across the proton-conducting membrane 110 to the negative electrode 112, the generated $e^-$ are directed to the power source 116 through external circuitry, and the generated $O_{2(g)}$ exits the electrolysis apparatus 104 as a gaseous $O_2$ stream 124. At the negative electrode 112, the generated $H^+$ exiting the proton-conducting membrane 110 react with $e^-$ received from the power source 116 to form H atoms which then combine to form $H_{2(g)}$, according to the following equation:

$$4H^+ + 4e^- \rightarrow 2H_{2(g)} \qquad (2).$$

The $H_{2(g)}$ then exits the electrolysis apparatus 104 as an $H_{2(g)}$ stream 126.

With the description provided below, it will be readily apparent to one of ordinary skill in the art that the methods, systems, and apparatuses described herein may be used in various systems. In other words, the methods, systems, and apparatuses of the disclosure may be used whenever it is desired to produce $H_{2(g)}$ from $H_2O$.

The steam generator 102 comprises at least one apparatus configured and operated to heat the liquid $H_2O$ stream 120 to a temperature sufficient to generate the gaseous $H_2O$ stream 122. By way of non-limiting example, the steam generator 102 may comprise a boiler apparatus configured and operated to heat the liquid $H_2O$ stream 120 to a temperature greater than or equal to 100° C. In some embodiments, the steam generator 102 is configured and operated to convert the liquid $H_2O$ stream 120 into a gaseous $H_2O$ stream 122 having a temperature within a range of an operating temperature of the electrolysis cell 106 of the electrolysis apparatus 104, such as a temperature within a range of from about 150° C. to about 650° C. In some embodiments, the steam generator 102 is configured and operated to convert the liquid $H_2O$ stream 120 into a gaseous $H_2O$ stream 122 having a temperature below the operating temperature of the electrolysis cell 106. In such embodiments, the heating apparatus 118 may be employed to further heat the gaseous $H_2O$ stream 122 to the operational temperature of the electrolysis cell 106, as described in further detail below.

The liquid $H_2O$ stream 120 entering the steam generator 102 and the gaseous $H_2O$ stream 122 exiting the steam generator 102 may each individually exhibit any pressure and any flow rate facilitating the formation of $H_{2(g)}$ within the electrolysis apparatus 104. One or more apparatuses (e.g., pumps, compressors, expanders, mass flow control devices, etc.) may be employed within the $H_{2(g)}$ production system 100 to adjust the pressure(s) and/or flow rate(s) of the liquid $H_2O$ stream 120 entering the steam generator 102 and/or the pressure(s) and/or flow rate(s) the gaseous $H_2O$ stream 122 exiting the steam generator 102.

A single (e.g., only one) liquid $H_2O$ stream 120 may be directed into the steam generator 102 and a single gaseous $H_2O$ stream 122 may exit the steam generator 102, or multiple (e.g., more than one) liquid $H_2O$ streams 120 may be directed into the steam generator 102 and/or multiple gaseous $H_2O$ streams 122 may exit the steam generator 102. If multiple liquid $H_2O$ streams 120 are directed into the steam generator 102, each of the multiple liquid $H_2O$ streams 120 may exhibit substantially the same properties (e.g., substantially the same temperature, substantially the same pressure, substantially the same flow rate, etc.), or at least one of the multiple liquid $H_2O$ streams 120 may exhibit one or more different properties (e.g., a different temperature, a different pressure, a different flow rate, etc.) than at least one other of the multiple liquid $H_2O$ streams 120. In addition, if multiple gaseous $H_2O$ streams 122 exit the steam generator 102, each of the multiple gaseous $H_2O$ streams 122 may exhibit substantially the same properties (e.g., substantially the same temperature, substantially the same pressure, substantially the same flow rate, etc.), or at least one of the multiple gaseous $H_2O$ streams 122 may exhibit one or more different properties (e.g., a different temperature; a different pressure; a different flow rate; etc.) than at least one other of the multiple gaseous $H_2O$ streams 122.

The heating apparatus 118, if present, may comprise at least one apparatus (e.g., one or more of a combustion heater, an electrical resistance heater, an inductive heater, and an electromagnetic heater) configured and operated to heat one or more of the gaseous $H_2O$ stream 122 and at least a portion of the electrolysis apparatus 104 to an operating temperature of the electrolysis cell 106 of the electrolysis apparatus 104. The operating temperature of the electrolysis cell 106 may at least partially depend on a material composition of the proton-conducting membrane 110 thereof, as described in further detail below. In some embodiments, the heating apparatus 118 heats one or more of the gaseous $H_2O$ stream 122 and the electrolysis cell 106 to a temperature within a range of from about 150° C. to about 650° C. In additional embodiments, such as in embodiments wherein the temperature of the gaseous $H_2O$ stream 122 exiting the steam generator 102 is already within the operating temperature range of the electrolysis cell 106, the heating apparatus 118 may be omitted (e.g., absent) from the $H_{2(g)}$ production system 100.

With continued reference to FIG. 1, the electrolysis apparatus 104, including the housing structure 114 and the electrolysis cell 106 thereof, is configured and operated to form the $H_{2(g)}$ stream 126 and the gaseous $O_2$ stream 124 from the gaseous $H_2O$ stream 122 according to the reactions of Equations (1) and (2) above. The housing structure 114 may exhibit any shape (e.g., a tubular shape, a quadrilateral shape, a spherical shape, a semi-spherical shape, a cylindrical shape, a semi-cylindrical shape, truncated versions thereof, or an irregular shape) and size able to contain (e.g., hold) the electrolysis cell 106 therein, to receive and direct the gaseous $H_2O$ stream 122 to the positive electrode 108 of the electrolysis cell 106, and to direct the $H_{2(g)}$ formed at the positive electrode 108 of the electrolysis cell 106 away from the electrolysis apparatus 104 as the $H_{2(g)}$ Stream 126. In addition, the housing structure 114 may be formed of and include any material (e.g., glass, metal, alloy, polymer, ceramic, composite, combinations thereof, etc.) compatible with the operating conditions (e.g., temperatures, pressures, etc.) of the electrolysis apparatus 104.

The housing structure 114 may at least partially define at least one internal chamber 128 at least partially surrounding the electrolysis cell 106. The electrolysis cell 106 may serve as a boundary between a first region 130 (e.g., an anodic region) of the internal chamber 128 configured and positioned to receive the gaseous $H_2O$ stream 122 and, and a second region 132 (e.g., a cathodic region) of the internal chamber 128 configured and positioned to receive the $H_{2(g)}$ produced at the positive electrode 108 of the electrolysis cell 106. $H_2O_{(g)}$ from the gaseous $H_2O$ stream 122 may be substantially limited to the first region 130 of the internal chamber 128 by the configurations and positions of the housing structure 114 and the electrolysis cell 106, such that the second region 132 of the internal chamber 128 is substantially free of $H_2O_{(g)}$. Accordingly, the positive electrode 108 may be exposed to the $H_2O_{(g)}$ from the gaseous $H_2O$ stream 122 without exposing the negative electrode 112 to the $H_2O_{(g)}$ from the gaseous $H_2O$ stream 122. Keeping the second region 132 of the internal chamber 128 substantially free of the $H_2O_{(g)}$ circumvents additional processing of the produced $H_{2(g)}$ (e.g., to separate the produced $H_{2(g)}$ from $H_2O_{(g)}$) that may otherwise be necessary if the $H_2O_{(g)}$ was provided within the second region 132 of the internal chamber 128. In addition, protecting the negative electrode 112 of the electrolysis cell 106 from exposure to the $H_2O_{(g)}$ may enhance the operational life (e.g., durability) of the electrolysis cell 106 as compared to conventional electrolysis cells by preventing undesirable oxidation of the negative electrode 112 that may otherwise occur in the presence of the $H_2O_{(g)}$.

As shown in FIG. 1, the positive electrode 108 and the negative electrode 112 of the electrolysis cell 106 are electrically coupled to a power source 116, and the proton-conducting membrane 110 is disposed on and between the positive electrode 108 and the negative electrode 112. The proton-conducting membrane 110 is configured and formulated to conduct H$^+$ from the positive electrode 108 to the negative electrode 112, while electrically insulating the negative electrode 112 from the positive electrode 108 and preventing the migration of gaseous materials (e.g., $O_{2(g)}$, $H_2O_{(g)}$) therethrough. Electrons generated at the positive electrode 108 through the reaction of Equation (1) described above may, for example, flow from the positive electrode 108 into a negative current collector, through the power source 116 and a positive electrode current collector, and into negative electrode 112 to facilitate the production of $H_{2(g)}$ through the reaction of Equation (2) described above.

The proton-conducting membrane 110 may be formed of and include at least one electrolyte material exhibiting an ionic conductivity (e.g., H$^+$ conductivity) greater than or equal to about $10^{-2}$ S/cm (e.g., within a range of from about $10^{-2}$ S/cm to about 1 S/cm) at one or more temperatures within a range of from about 150° C. to about 650° C. (e.g., from about 200° C. to about 600° C.). In addition, the electrolyte material may be formulated to remain substantially adhered (e.g., laminated) to the positive electrode 108 and the negative electrode 112 at relatively high current densities, such as at current densities greater than or equal to about 0.1 amperes per square centimeter (A/cm$^2$) (e.g., greater than or equal to about 0.5 A/cm$^2$, greater than or equal to about 1.0 A/cm$^2$, greater than or equal to about 2.0 A/cm$^2$, etc.). For example, the proton-conducting membrane 110 may comprise one or more of a perovskite material, a solid acid material, and a polybenzimidazole (PBI) material. The material composition of the proton-conducting membrane 110 may provide the proton-conducting membrane 110 with enhanced ionic conductivity at a temperature within the range of from about 150° C. to about 650° C. as compared to conventional membranes (e.g., membranes employing conventional electrolyte materials, such as yttria-stabilized zirconia (YSZ)) of conventional electrolysis cells. By way of non-limiting example, the electrolyte material (e.g., perovskite material, solid acid material, PBI material) of the proton-conducting membrane 110 may have orders of magnitude higher ionic conductivity than YSZ at operational temperatures thereof within the range of from about 150° C. to about 650° C.

In some embodiments, the proton-conducting membrane 110 is formed of and includes at least one perovskite material having an operational temperature (e.g., a temperature at which the H$^+$ conductivity of the perovskite material is greater than or equal to about $10^{-2}$ S/cm, such as within a range of from about $10^{-2}$ S/cm to about $10^{-1}$ S/cm) within a range of from about 350° C. to about 650° C. By way of non-limiting example, the proton-conducting membrane 110 may comprise one or more of a yttrium- and ytterbium-doped barium-zirconate-cerate (BZCYYb), such as $BaZr_{0.8-y}Ce_yY_{0.2-x}Yb_xO_{3-\delta}$, wherein x and y are dopant levels and $\delta$ is the oxygen deficit (e.g., $BaZr_{0.3}Ce_{0.5}Y_{0.1}Yb_{0.1}O_{3-\delta}$); a yttrium- and ytterbium-doped barium-strontium-niobate (BSNYYb), such as $Ba_3(Sr_{1-x}Nb_{2-y}Y_xYb_y)O_{9-\delta}$, wherein x and y are dopant levels and $\delta$ is the oxygen deficit; doped barium-cerate (BaCeO$_3$) (e.g., yttrium-doped BaCeO$_3$ (BCY)); doped barium-zirconate (BaZrO$_3$) (BZY); barium-yttrium-stannate (Ba$_2$(YSn)O$_{5.5}$); and barium-calcium-niobate (Ba$_3$(CaNb$_2$)O$_9$). In some embodiments, the proton-conducting membrane 110 comprises BZCYYb.

In further embodiments, the proton-conducting membrane 110 is formed of and includes at least one solid acid material having an operational temperature (e.g., a temperature at which the H$^+$ conductivity of the solid acid material is greater than or equal to about $10^{-2}$ S/cm, such as within a range of from about $10^{-2}$ S/cm to about 1 S/cm) within a range of from about 200° C. to about 400° C. By way of non-limiting example, the proton-conducting membrane 110 may comprise a solid acid phosphate material, such as solid acid cesium dihydrogen phosphate (CsH$_2$PO$_4$). The solid acid material may be doped (e.g., doped CsH$_2$PO$_4$), or may be undoped (e.g., undoped CsH$_2$PO$_4$). In some embodiments, the proton-conducting membrane 110 comprises CsH$_2$PO$_4$.

In additional embodiments, the proton-conducting membrane 110 is formed of and includes at least one PBI material having an operational temperature (e.g., a temperature at which the H$^+$ conductivity of the PBI material is greater than or equal to about $10^{-2}$ S/cm, such as within a range of from about $10^{-2}$ S/cm to about 1 S/cm) within a range of from about 150° C. to about 250° C. By way of non-limiting example, the proton-conducting membrane 110 may comprise a doped PBI, such as phosphoric acid (H$_3$PO$_4$) doped PBI. In some embodiments, the proton-conducting membrane 110 comprises H$_3$PO$_4$-doped PBI.

The proton-conducting membrane 110 may be substantially homogeneous or may be substantially heterogeneous. As used herein, the term "homogeneous" means amounts of a material do not vary throughout different portions (e.g., different lateral and longitudinal portions) of a structure. Conversely, as used herein, the term "heterogeneous" means amounts of a material vary throughout different portions of a structure. Amounts of the material may vary stepwise (e.g., change abruptly), or may vary continuously (e.g., change progressively, such as linearly, parabolically) throughout different portions of the structure. In some embodiments, the proton-conducting membrane 110 is substantially homogeneous. In additional embodiments, the proton-conducting membrane 110 is heterogeneous. The proton-conducting membrane 110 may, for example, be formed of and include a stack of at least two (e.g., at least three, at least four, etc.) different materials. As a non-limiting example, the proton-conducting membrane 110 may comprise a stack of at least two (e.g., at least three, at least four, etc.) different perovskite materials individually having an operational temperature within a range of from about 350° C. to about 650° C. As another non-limiting example, the proton-conducting membrane 110 may comprise a stack of at least two (e.g., at least three, at least four, etc.) different solid acid materials individually having an operational temperature within a range of from about 200° C. to about 400° C. As a further non-limiting example, the proton-conducting membrane 110 may comprise a stack of at least two (e.g., at least three, at least four, etc.) different PBI materials individually having an operational temperature within a range of from about 150° C. to about 250° C.

The proton-conducting membrane 110 may exhibit any desired dimensions (e.g., length, width, thickness) and any desired shape (e.g., a cubic shape, cuboidal shape, a tubular shape, a tubular spiral shape, a spherical shape, a semi-spherical shape, a cylindrical shape, a semi-cylindrical shape, a conical shape, a triangular prismatic shape, a truncated version of one or more of the foregoing, and irregular shape). The dimensions and the shape of the proton-conducting membrane 110 may be selected such that the proton-conducting membrane 110 substantially intervenes between opposing surfaces of the positive electrode 108 and the negative electrode 112, and exhibits an H$^+$ conductivity greater than or equal to about $10^{-2}$ S/cm (e.g., from about $10^{-2}$ S/cm to about 1 S/cm) at a temperature within a range of from about 150° C. to about 650° C. A thickness of the proton-conducting membrane 110 may be within a range of from about 5 micrometers (μm) to about 1000 μm, and may at least partially depend on the material composition of the proton-conducting membrane 110. For example, a proton-conducting membrane 110 formed of and including at least one perovskite material may have a thickness with a range of from about 5 m to about 1000 μm; a proton-conducting membrane 110 formed of and including at least one solid acid material may have a thickness with a range of from about 5 m to about 1000 μm; and a proton-conducting membrane 110 formed of and including at least one PBI material may have a thickness with a range of from about 50 μm to about 1000 μm.

The positive electrode 108 and the negative electrode 112 may individually be formed of and include at least one material compatible with the material composition of the proton-conducting membrane 110 and the operating conditions (e.g., temperature, pressure, current density, etc.) of the electrolysis cell 106, and facilitating the formation of the $H_{2(g)}$ stream 126 and the gaseous $O_2$ stream 124 from the gaseous $H_2O$ stream 122 at an operational temperature within the range of from about 150° C. to about 650° C. according to the reactions of Equations (1) and (2) described above. Accordingly, the material compositions of the positive electrode 108 and the negative electrode 112 may be selected relative to one another, the material composition of the proton-conducting membrane 110, and the operating conditions of the electrolysis cell 106.

As a non-limiting example, if the proton-conducting membrane 110 comprises a perovskite material (e.g., a BZCYYb, a BSNYYb, a doped $BaCeO_3$, a doped $BaZrO_3$, $Ba_2(YSn)O_{5.5}$, $Ba_3(CaNb_2)O_9$, etc.) having an operational temperature within a range of from about 350° C. to about 650° C., the positive electrode 108 and negative electrode 112 may each individually comprise other perovskite materials compatible with the perovskite material of the proton-conducting membrane 110. The positive electrode 108 may, for example, comprise one or more of a double perovskite material, such as $MBa_{1-x}Sr_xCo_{2-y}Fe_yO_{5+\delta}$, wherein x and y are dopant levels, δ is the oxygen deficit, and M is Pr, Nd, or Sm (e.g., $PrBa_{0.5}Sr_{0.5}Co_{1.5}Fe_{0.5}O_{5+\delta}$ (PB SCF), $NdBa_{0.5}Sr_{0.5}Co_{1.5}Fe_{0.5}O_{5+\delta}$, $SmBa_{0.5}Sr_{0.5}Co_{1.5}Fe_{0.5}O_{5+\delta}$); a single perovskite material, such as $Sm_{1-x}Sr_xCoO_{3-\delta}$ (SSC), $BaZr_{1-x-y-z}Co_xFe_yY_zO_{3-\delta}$, or $SrSc_xNd_yCo_{1-x-y}O_{3-\delta}$, wherein x, y, and z are dopant levels and δ is the oxygen deficit; a Ruddleson-Popper-type perovskite material, such as $M_2NiO_{4-\delta}$, wherein δ is the oxygen deficit and M is La, Pr, Gd, or Sm (e.g., $La_2NiO_{4-\delta}$, $Pr_2NiO_{4-\delta}$, $Gd_2NiO_{4-\delta}$, $Sm_2NiO_{4-\delta}$); and a single perovskite/perovskite composite material such as SSC—BZCYYb. In addition, the negative electrode 112 may, for example, comprise a cermet material comprising at least one metal (e.g., Ni) and at least one perovskite, such as a nickel/perovskite cermet (Ni-perovskite) material (e.g., Ni—BZCYYb, Ni—BSNYYb, Ni—$BaCeO_3$, Ni—$BaZrO_3$, Ni—$Ba_2(YSn)O_{5.5}$, Ni—$Ba_3(CaNb_2)O_9$). In some embodiments, the proton-conducting membrane 110 comprises BZCYYb, the positive electrode 108 comprises SSC—BZCYYb, and the negative electrode 112 comprises Ni—BZCYYb.

As another non-limiting example, if the proton-conducting membrane 110 comprises a solid acid material (e.g., a doped $CsH_2PO_4$, an undoped $CsH_2PO_4$) having an operational temperature within a range of from about 200° C. to about 400° C., the positive electrode 108 may comprise one or more of a metal, an alloy, and an oxide compatible with the solid acid material of the proton-conducting membrane 110, and the negative electrode 112 may comprise a cermet comprising at least one metal and at least one solid acid compatible with the solid acid material of the proton-conducting membrane 110. The positive electrode 108 may, for example, comprise one or more of Ni, a Ni alloy, and an Aurivillius oxide (e.g., $Bi_2Sr_2Nb_2MnO_{12-\delta}$, wherein δ is the oxygen deficit). The negative electrode 112 may, for example, comprise a precious metal/solid acid cermet (e.g., Pt—$CsH_2PO_4$).

As another non-limiting example, if the proton-conducting membrane 110 comprises a PBI material (e.g., a doped PBI) having an operational temperature within a range of from about 150° C. to about 250° C., the positive electrode 108 and the negative electrode 112 may individually comprise one or more of metals and alloys compatible with the PBI material of the proton-conducting membrane 110. The positive electrode 108 and the negative electrode 112 may, for example, comprise one or more of Ni, Pt, a Ni alloy, and a Pt alloy.

Optionally, one or more of the positive electrode 108 and the negative electrode 112 may include at least one additional catalyst material thereon, thereover, and/or therein. As used herein, the terms "catalyst material" and "catalyst" each mean and include a material formulated to promote one or more reactions, resulting in the formation of a product. For example, an additional catalyst material may be included on, over, and/or within the material of the positive electrode 108 to accelerate reaction rates within the positive electrode 108 to produce $O_{2(g)}$, $H^+$, e, and heat from $H_2O_{(g)}$ in accordance with Equation (1) above. In some embodiments, a Pr—Ni—Fe oxide is provided on, over, and/or within the positive electrode 108 to accelerate oxygen evolution reaction (OER) rates therein. As another example, a catalyst material may be included on, over, and/or within the material of the negative electrode 112 to accelerate reaction rates within the positive electrode 108 to produce $H_{2(g)}$ from $H^+$ and $e^-$ in accordance with Equation (2) above. In some embodiments, nano-sized (e.g., having a cross-sectional width or diameter less than about one (1)μm, such as less than or equal to about 100 nanometers (nm), less than or equal to about 20 nm, or less than or equal to about 10 nm) particles are provided on, over, and/or within the negative electrode 112 to accelerate hydrogen evolution reaction (HER) and water oxidation reaction (WOR) rates therein.

The positive electrode 108 and the negative electrode 112 may individually exhibit any desired dimensions (e.g., length, width, thickness) and any desired shape (e.g., a cubic shape, a cuboidal shape, a tubular shape, a tubular spiral shape, a spherical shape, a semi-spherical shape, a cylindrical shape, a semi-cylindrical shape, a conical shape, a triangular prismatic shape, a truncated version of one or more of the foregoing, and irregular shape). The dimensions and the shapes of the positive electrode 108 and the negative electrode 112 may be selected relative to the dimensions and the shape of the proton-conducting membrane 110 such that the proton-conducting membrane 110 substantially intervenes between opposing surfaces of the positive electrode 108 and the negative electrode 112. Thicknesses of the positive electrode 108 and the negative electrode 112 may individually be within a range of from about 10 μm to about 1000 μm.

The electrolysis cell 106, including the positive electrode 108, the proton-conducting membrane 110, and the negative electrode 112 thereof, may be formed through conventional processes (e.g., rolling process, milling processes, shaping processes, pressing processes, consolidation processes, etc.), which are not described in detail herein. The electrolysis cell 106 may be mono-faced or bi-faced and may have a prismatic, folded, wound, cylindrical, or jelly rolled configuration. The electrolysis cell 106 may be placed within the housing structure 114 to form the electrolysis apparatus 104, and may be electrically connected to the power source 116.

Although the electrolysis apparatus 104 is depicted as including a single (i.e., only one) electrolysis cell 106 in FIG. 1, the electrolysis apparatus 104 may include any number of electrolysis cells 106. Put another way, the electrolysis apparatus 104 may include a single (e.g., only one) electrolysis cell 106, or may include multiple (e.g., more than one) electrolysis cells 106. If the electrolysis apparatus 104 includes multiple electrolysis cells 106, each of the electrolysis cells 106 may be substantially the same (e.g., exhibit substantially the same components, component sizes, component shapes, component material compositions, component material distributions, component positions, component orientations, etc.) and may be operated under substantially the same conditions (e.g., substantially the same temperatures, pressures, flow rates, etc.), or at least one of the electrolysis cells 106 may be different (e.g., exhibit one or more of different components, different component sizes, different component shapes, different component material compositions, different component material distributions, different component positions, different component orientations, etc.) than at least one other of the electrolysis cells 106 and/or may be operated under different conditions (e.g., different temperatures, different pressures, different flow rates, etc.) than at least one other of the electrolysis cells 106. By way of non-limiting example, one of the electrolysis cells 106 may be configured for and operated under a different temperature (e.g., different operating temperature resulting from a different material composition of one of more components thereof, such as a different material composition of the proton-conducting membrane 110 thereof) than at least one other of the electrolysis cells 106. In some embodiments, two of more electrolysis cells 106 are provided in parallel with one another within the housing structure 114 of the electrolysis apparatus 104, and individually produce a portion of the $H_{2(g)}$ directed out of the electrolysis apparatus 104 as the $H_{2(g)}$ stream 126.

In addition, although the $H_{2(g)}$ production system 100 is depicted as including a single (i.e., only one) electrolysis apparatus 104 in FIG. 1, the $H_{2(g)}$ production system 100 may include any number of electrolysis apparatuses 104. Put another way, the $H_{2(g)}$ production system 100 may include a single (e.g., only one) electrolysis apparatus 104, or may include multiple (e.g., more than one) electrolysis apparatuses 104. If the $H_{2(g)}$ production system 100 includes multiple electrolysis apparatuses 104, each of the electrolysis apparatuses 104 may be substantially the same (e.g., exhibit substantially the same components, component sizes, component shapes, component material compositions, component material distributions, component positions, component orientations, etc.) and may be operated under substantially the same conditions (e.g., substantially the same temperatures, pressures, flow rates, etc.), or at least one of the electrolysis apparatus 104 may be different (e.g., exhibit one or more of different components, different component sizes, different component shapes, different component material compositions, different component material distributions, different component positions, different component orientations, etc.) than at least one other of the electrolysis apparatuses 104 and/or may be operated under different conditions (e.g., different temperatures, different pressures, different flow rates, etc.) than at least one other of the electrolysis apparatuses 104. By way of non-limiting example, one of the electrolysis apparatuses 104 may be configured for and operated under a different temperature (e.g., a different operating temperature resulting from a different material composition of one of more components of an electrolysis cell 106 thereof, such as a different material composition of the proton-conducting membrane 110 thereof) than at least one other of the electrolysis apparatuses 104. In some embodiments, two of more electrolysis apparatuses 104 are provided in parallel with one another, and each of the two of more electrolysis apparatuses 104 individually receive a gaseous $H_2O$ stream 122 and individually produce an $H_{2(g)}$ stream 126.

Still referring to FIG. 1, the gaseous $O_2$ stream 124 and the $H_{2(g)}$ stream 126 exiting the electrolysis apparatus 104 may individually be utilized or disposed of as desired. In some embodiments, the gaseous $O_2$ stream 124 is vented, and the $H_{2(g)}$ stream 126 is compressed and delivered into one or more storage vessels for subsequent use, as desired. In additional embodiments, at least a portion of one or more of the gaseous $O_2$ stream 124 and the $H_{2(g)}$ stream 126 may be utilized (e.g., combusted) to heat one or more components (e.g., the steam generator 102; the heating apparatus 118 (if present); the electrolysis apparatus 104; etc.) and/or streams (e.g., the liquid $H_2O$ stream 120, the gaseous $H_2O$ stream 122, etc.) of the $H_{2(g)}$ production system 100. By way of non-limiting example, as shown in FIG. 1, if one or more of the steam generator 102 and the heating apparatus 118 (if present) is a combustion-based apparatus, at least a portion of one or more of the gaseous $O_2$ stream 124 and the $H_{2(g)}$ stream 126 may be directed into the steam generator 102 and/or the heating apparatus 118 and undergo an combustion reaction to efficiently heat one or more of the liquid $H_2O$ stream 120 entering the steam generator 102, the gaseous $H_2O$ stream 122 exiting the steam generator 102, and at least a portion of the electrolysis apparatus 104. Utilizing the gaseous $O_2$ stream 124 and/or the $H_{2(g)}$ stream 126 as described above may reduce the electrical power requirements of the $H_{2(g)}$ production system 100 by enabling the utilization of direct thermal energy.

Thermal energy input into (e.g., through gaseous $H_2O$ stream 122, and the heating apparatus 118 (if present)) and/or generated by the electrolysis apparatus 104 may also be used to heat one or more other components (e.g., the steam generator 102; the heating apparatus 118 (if present); etc.) and/or streams (e.g., the liquid $H_2O$ stream 120, the gaseous $H_2O$ stream 122, etc.) of the $H_{2(g)}$ production system 100. By way of non-limiting example, the gaseous $O_2$ stream 124 and/or the $H_{2(g)}$ stream 126 exiting the may be directed into a heat exchanger configured and operated to facilitate heat exchange between the gaseous $O_2$ stream 124 and/or the $H_{2(g)}$ stream 126 of the $H_{2(g)}$ production system 100 and one or more other relatively cooler streams (e.g., the liquid $H_2O$ stream 120, the gaseous $H_2O$ stream 122) of the $H_{2(g)}$ production system 100 to transfer heat from the gaseous $O_2$ stream 124 and/or the $H_{2(g)}$ stream 126 to the relatively cooler stream(s) to facilitate the recovery of the thermal energy input into and generated within the electrolysis apparatus 104. The recovered thermal energy may increase process efficiency and/or reduce operational costs without having to react (e.g., combust) $O_{2(g)}$ Of the gaseous $O_2$ stream 124 and/or $H_{2(g)}$ of the $H_{2(g)}$ stream 126.

The methods, systems (e.g., the $H_{2(g)}$ production system 100), and apparatuses (e.g., the electrolysis apparatus 104, including the electrolysis cell 106 thereof) of the disclosure facilitate the simple and efficient electrolysis of $H_2O$ at intermediate temperatures, such as temperatures within a range of from about 150° C. to about 650° C. The methods, systems, and apparatuses of the disclosure may reduce one or more of the time (e.g., processing steps), costs (e.g., material costs), and energy (e.g., thermal energy, electrical energy, etc.) required to produce $H_{2(g)}$ (e.g., substantially pure, dry $H_{2(g)}$) relative to conventional methods, systems, and apparatuses of producing $H_{2(g)}$ through $H_2O$ electrolysis. In addition, the methods, systems, and apparatuses of the disclosure may avoid undesirable equipment (e.g., electrolysis cell) degradation (e.g., thermal degradation, chemical degradation) and/or damage (e.g., delamination(s)) associated with conventional methods, systems, and apparatuses of producing $H_{2(g)}$ through $H_2O$ electrolysis. Accordingly, the methods, systems, and apparatuses of the disclosure may be more efficient, durable, and reliable than conventional methods, conventional systems, and conventional apparatuses of producing $H_{2(g)}$ through $H_2O$ electrolysis.

The following examples serve to explain embodiments of the disclosure in more detail. These examples are not to be construed as being exhaustive or exclusive as to the scope of the disclosure.

EXAMPLES

Example 1

Figure 2:
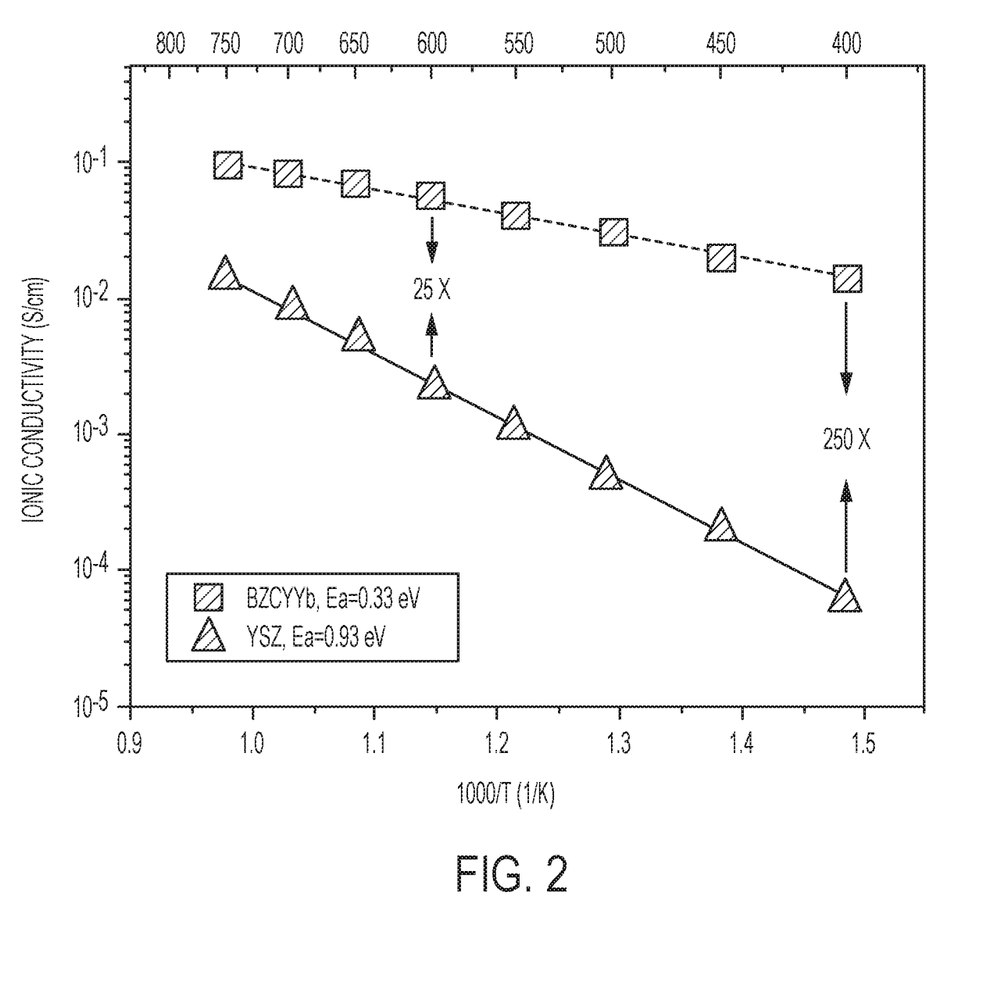
FIG. 2 is a graphical representation of the results described in Example 1.

The ionic conductivity of BZCYYb at different temperatures within a range of from 400° C. to 750° C. was compared to that of YSZ. FIG. 2 is a graph showing the results of the analysis. As shown in FIG. 2, the BZCYYb exhibited superior ionic conductivity relative to YSZ across all of the temperatures within the range of from 400° C. to 750° C., with increasing differences in ionic conductivity as the temperatures traveled toward the 400° C. boundary of the range. For example, at 600° C. the ionic conductivity of the BZCYYb was about 25 times (25×) greater than that of YSZ, and at 400° C. the ionic conductivity of the BZCYYb was about 250 times (250×) greater than that of YSZ. The results indicate that an electrolysis cell employing BZCYYb as an electrolyte material will facilitate enhanced $H_{2(g)}$ production at least at temperatures less than or equal to about 750° C. (e.g., from about 400° C. to about 750° C.) relative to an electrolysis cell employing YSZ.

Example 2

Figure 3:
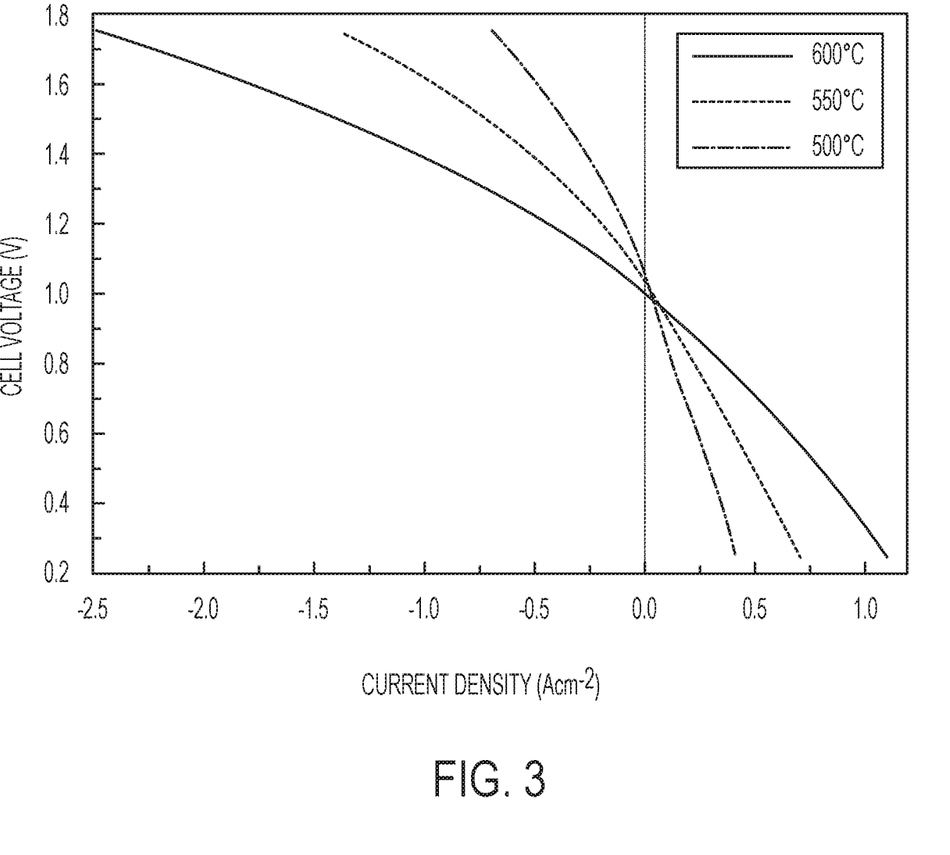
FIG. 3 is a graphical representation of the results described in Example 2.

The current-voltage characteristic of an electrolysis cell exhibiting the general configuration of the electrolysis cell 106 shown in FIG. 1, including a positive electrode (e.g., the positive electrode 108) comprising SSC—BZCYYb, a proton-conducting membrane (e.g., the proton-conducting membrane 110) comprising BZCYYb, and a negative electrode (e.g., the negative electrode 112) comprising Ni—BZCYYb were analyzed using different cell operating temperatures within a range of from 500° C. to 600° C. and a gaseous $H_2O_{(g)}$ stream comprising 12.0 vol % $H_2O_{(g)}$. FIG. 3 is a graph showing the results of the analysis. As shown in FIG. 3, the open circuit values (OCV) of the electrolysis cell were about 1.1 V, indicating that the proton-conducting membrane showed pure ionic conductivity. The results indicate that the electrolysis cell may at least be operated at temperatures less than 600° C. (e.g., at least at temperatures within a range of from 500° C. to 600° C.) to produce $H_{2(g)}$ at a higher production rate than conventional YSZ-based electrolysis cells.

Example 3

The performance of an electrolysis cell configuration of the disclosure including a proton-conducting membrane comprising BZCYYb, a positive electrode comprising PBSCF, and a negative electrode comprising Ni—BZCYYb was compared against conventional electrolysis cell configurations. Table 1 below summarizes the results of the analysis. The results indicate that the electrolysis cell configuration of the disclosure exhibits improved performance (e.g., higher current density) and may employ lower operational temperatures (e.g., 600° C., 550° C., 500° C.) relative to conventional electrolysis cell configurations.

TABLE 1

| Proton-Conducting Membrane | Positive Electrode | Negative Electrode | Temp (° C.) | Steam Ratio | Applied Voltage (V) | Current Density (A/cm²) |
|---|---|---|---|---|---|---|
| BZCYYb | PBSCF | Ni-BZCYYb | 600 | 3% | 1.6 | 1.53 |
|  |  |  | 550 |  |  | 0.75 |
|  |  |  | 500 |  |  | 0.32 |
| $BaCe_{0.5}Zr_{0.3}Y_{0.2}O_{3+\delta}$(BCZY) | $Sm_{0.5}Sr_{0.5}CoO_3$ (SSC)-BZCY | Ni-BZCY | 600 | 50% | 1.5 | 0.33 |
| $BaCe_{0.5}Zr_{0.3}Y_{0.16}Zn_{0.04}O_{3+\delta}$ (BCZYZ) | $La_{0.8}Sr_{0.2}Mn_{1-x}Sc_xO_{3+\delta}$ | $La_{0.75}Sr_{0.25}Cr_{0.5}Mn_{0.5}O_{3+\delta}$ (LSCM) | 700 | 5% | 1.6 | 0.04 |
| BCZYZ | $Fe_2O_3$-LSM-BCZYZ | LSCM-BZCYZ | 800 | 5% | 1.6 | 0.07 |
| BCZYZ | LSCM-BCZYZ | Ni-BCZYZ | 700 | 3% | 1.6 | 1.3 |
| $BaZr_{0.9}Y_{0.1}O_{3+\delta}$ (BZY) | $La_{0.6}Sr_{0.4}Co_{0.2}Fe_{0.8}O_{3+\delta}$ (LSCF)-BZY | Ni-BZY | 600 | 3% | 1.6 | 0.12 |

Example 4

Figure 4:
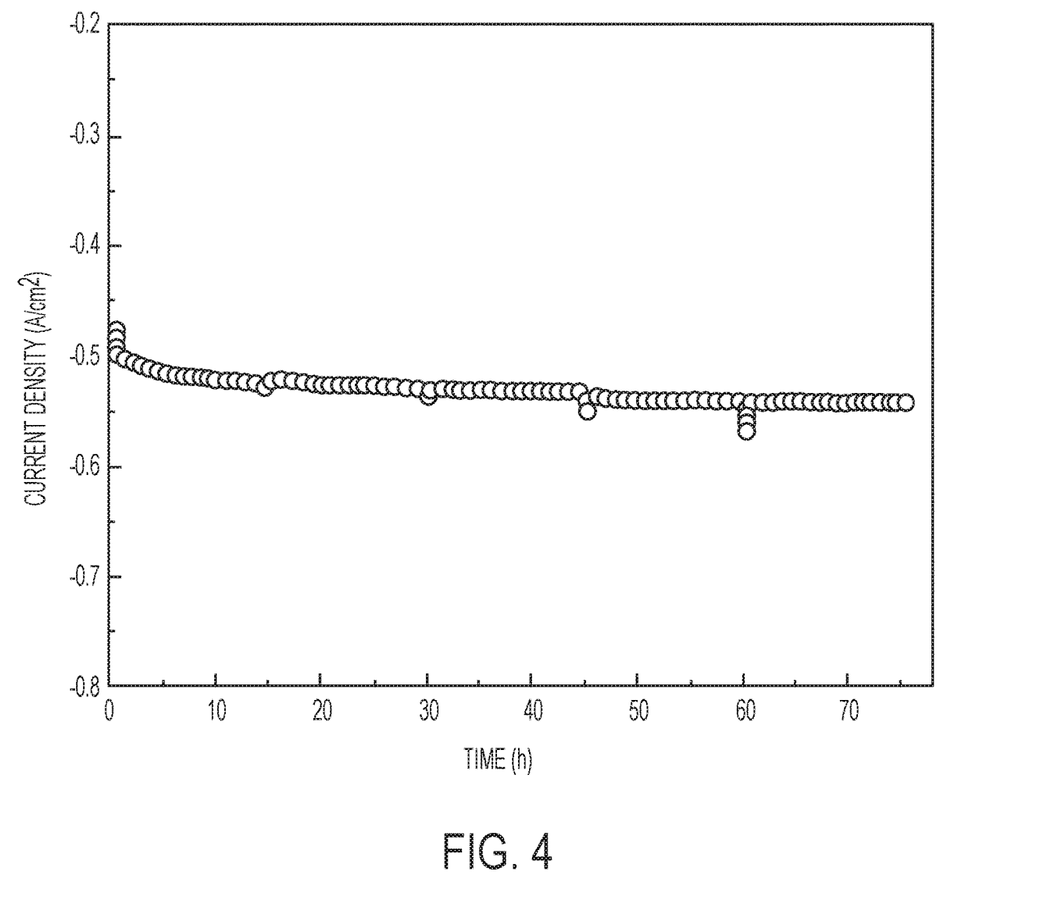
FIGS. 4 and 5 are graphical representations of the results described in Example 4.

The durability of an electrolysis cell configuration of the disclosure including a proton-conducting membrane comprising BZCYYb, a positive electrode comprising PBSCF, and a negative electrode comprising Ni—BZCYYb was analyzed using a cell operating temperature of 500° C., an applied voltage of 1.6 V, and a gaseous $H_2O_{(g)}$ stream comprising 12.0 vol % $H_2O_{(g)}$. FIG. 4 is a graph showing the results of the analysis. No degradation to the electrolysis cell was observed over the 75 hour duration of the durability test. As shown in FIG. 4, the current density was negative (indicative of discharge), and increased continuously over the entire duration of the durability test, indicating that the electrolysis cell was constantly activated for 75 hours.

Figure 5:
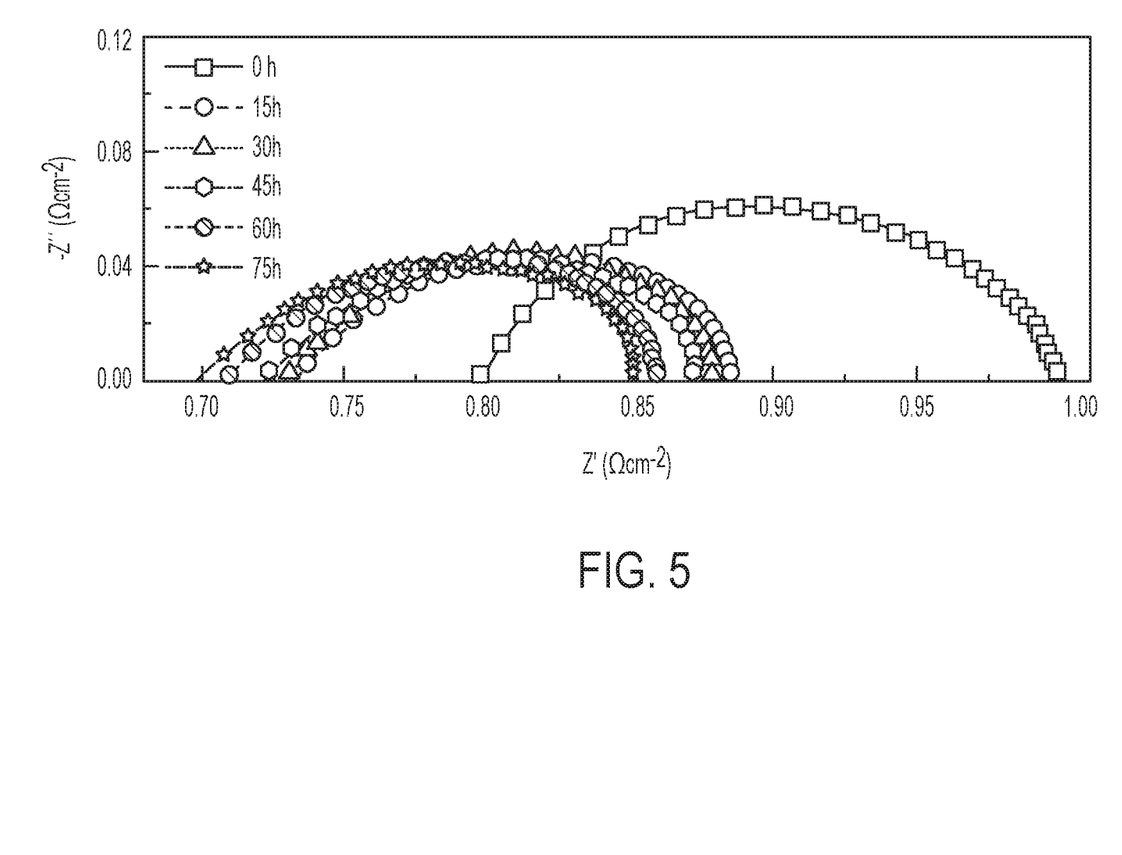

Electrochemical Impedance Spectroscopy (EIS) analysis was also performed on the electrolysis cell configuration every 15 hours throughout the duration of the durability test. FIG. 5 is a graph showing the results of the EIS analysis, and Table 2 below summarizes the results of the EIS analysis. As shown in FIG. 5 and summarized in Table 2, the polarization resistance ($R_p$) essentially remained stable from hours 15 to 75 while the ohmic resistance ($R_s$) decreased throughout the duration of the testing.

TABLE 2

| Time (h) | $R_s$ | $R_p$ | $R_{total}$ |
|---|---|---|---|
| 0 | 0.791 | 0.210 | 1.001 |
| 15 | 0.737 | 0.148 | 0.885 |
| 30 | 0.725 | 0.151 | 0.876 |
| 45 | 0.715 | 0.153 | 0.868 |
| 60 | 0.701 | 0.155 | 0.856 |
| 75 | 0.690 | 0.155 | 0.845 |

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalent. For example, elements and features disclosed in relation to one embodiment may be combined with elements and features disclosed in relation to other embodiments of the disclosure.

What is claimed is:

1. A method of producing hydrogen gas, comprising:
introducing gaseous water to an electrolysis cell comprising a positive electrode, a negative electrode, and a proton-conducting membrane between the positive electrode and the negative electrode, the proton-conducting membrane comprising at least one perovskite material having an ionic conductivity greater than or equal to about $10^{-2}$ S/cm at one or more temperatures within a range of from about 150° C. to about 650° C. and selected to comprise one or more of yttrium- and ytterbium-doped barium-zirconate-cerate (BZCYYb) of the composition $BaZr_{0.8-y}Ce_yY_{0.2-x}Yb_xO_{3-\delta}$, and yttrium- and ytterbium-doped barium-strontium-niobate (BSNYYb) of the composition $Ba_3(Sr_{1-x}Nb_{2-y}Y_xYb_y)O_{9-\delta}$, wherein x and y are dopant levels and $\delta$ is oxygen deficit; and
decomposing the gaseous water using the electrolysis cell.

2. The method of claim 1, further comprising selecting the at least one perovskite material to have a $H^+$ conductivity greater than or equal to about $10^{-2}$ S/cm at one or more temperatures within a range of from about 350° C. to about 650° C.

3. The method of claim 2, further comprising selecting the at least one perovskite material to comprise a stack of at least two different perovskite materials each individually having the $H^+$ conductivity greater than or equal to about $10^{-2}$ S/cm at the one or more temperatures within the range of from about 350° C. to about 650° C.

4. The method of claim 2, further comprising:
selecting the positive electrode to comprise one or more of a double perovskite material, a single perovskite material, a Ruddleson-Popper-type perovskite material, and a composite material comprising at least two different perovskite materials; and
selecting the negative electrode to comprise a cermet material comprising at least one metal and at least one perovskite.

5. The method of claim 1, wherein introducing gaseous water to the electrolysis cell comprises exposing the positive electrode of the electrolysis cell to the gaseous water without exposing the negative electrode of the electrolysis cell to the gaseous water.

6. The method of claim 1, further comprising heating the gaseous water to a temperature within the range of from about 150° C. to about 650° C. effectuating the ionic conductivity greater than about $10^{-2}$ S/cm within the proton-conducting membrane prior to decomposing the gaseous water using the at least one electrolysis cell.

7. The method of claim 1, wherein the yttrium- and ytterbium-doped barium-zirconate-cerate (BZCYYb) comprises $BaZr_{0.3}Ce_{0.5}Y_{0.1}Yb_{0.1}O_{3-\delta}$.

8. The method of claim 1, further comprising selecting the proton-conducting membrane to have a thickness within a range of from about 5 µm to about 1000 µm.

9. The method of claim 1, further comprising selecting the proton-conducting membrane to be substantially homogeneous.

10. The method of claim 1, further comprising selecting the positive electrode to comprise $MBa_{1-x}Sr_xCo_{2-y}Fe_yO_{5+\delta}$, where M is Pr, Nd, or Sm.

11. The method of claim 10, further comprising selecting the positive electrode to comprise one or more of $PrBa_{0.5}Sr_{0.5}Co_{1.5}Fe_{0.5}O_{5+\delta}$, $NdBa_{0.5}Sr_{0.5}Co_{1.5}Fe_{0.5}O_{5+\delta}$, and $SmBa_{0.5}Sr_{0.5}Co_{1.5}Fe_{0.5}O_{5+\delta}$.

12. The method of claim 1, further comprising selecting the positive electrode to comprise $M_2NiO_{4-\delta}$, where M is La, Pr, Gd, or Sm.

13. The method of claim 1, further comprising selecting the positive electrode to comprise a composite material comprising $Sm_{1-x}Sr_xCoO_{3-\delta}$ and $BaZr_{0.8-y}Ce_yY_{0.2-x}Yb_xO_{3-\delta}$.

14. The method of claim 1, further comprising selecting the negative electrode to comprise a cermet material comprising nickel and one of yttrium- and ytterbium-doped barium-zirconate-cerate (BZCYYb), yttrium- and ytterbium-doped barium-strontium-niobate (BSNYYb), barium-yttrium-stannate, and barium-calcium-niobate.

* * * * *

UNITED STATES PATENT AND TRADEMARK OFFICE
CERTIFICATE OF CORRECTION

PATENT NO. : 11,198,941 B2
APPLICATION NO. : 16/483631
DATED : December 14, 2021
INVENTOR(S) : He et al.

Page 1 of 2

It is certified that error appears in the above-identified patent and that said Letters Patent is hereby corrected as shown below:

On the Title Page
In ITEM (57)         Line 3,        change "proton conducting" to --proton-conducting--
                     Line 5,        change "proton conducting" to --proton-conducting--

In the Specification
    Column 4,   Line 51,   change "electrons (e)" to --electrons (e$^-$)--
    Column 6,   Line 30,   change "Stream" to --stream--
    Column 7,   Line 64,   change "(BZY);" to --(e.g., yttrium-doped BaCeO$_3$ (BZY));--
    Column 9,   Line 9,    change "5 m" to --5 µm--
    Column 9,   Line 12,   change "5 m" to --5 µm--
    Column 9,   Line 43,   change "(PB SCF)," to --(PBSCF),--
    Column 9,   Line 49,   change "wherein 6" to --wherein δ--
    Column 9,   Line 52,   change "SSC—BZCYYb." to --SSC-BZCYYb.--
    Column 9,   Line 56,   change "Ni—BZCYYb, Ni—BSNYYb, Ni—" to --Ni-BZCYYb, Ni-BSNYYb, Ni- --
    Column 9,   Line 57,   change "Ni—BaZrO$_3$, Ni—Ba$_2$(YSn)O$_{5.5}$, Ni—Ba$_3$" to --Ni-BaZrO$_3$, Ni-Ba$_2$(YSn)O$_{5.5}$, Ni-Ba$_3$--
    Column 9,   Line 60,   change "SSC—BZCYYb," to --SSC-BZCYYb,--
    Column 9,   Line 61,   change "Ni—BZCYYb." to --Ni-BZCYYb.--
    Column 10,  Line 7,    change "wherein 6" to --wherein δ--
    Column 10,  Line 10,   change "P—CsH$_2$PO$_4$)." to --P-CsH$_2$PO$_4$).--
    Column 10,  Line 30,   change "H$^+$, e, and" to --H$^+$, e$^-$, and--
    Column 10,  Line 32,   change "Pr—Ni—Fe" to --Pr-Ni-Fe--
    Column 12,  Line 59,   change "Of the" to --of the--
    Column 14,  Line 1,    change "SSC—BZCYYb," to --SSC-BZCYYb,--
    Column 14,  Line 4,    change "Ni—" to --Ni- --
    Column 14,  Line 22,   change "Ni—BZCYYb" to --Ni-BZCYYb--
    Column 14,  Line 54,   change "Ni—BZCYYb" to --Ni-BZCYYb--

Signed and Sealed this
Eleventh Day of January, 2022

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,198,941 B2

In the Claims

Claim 1, Column 15, Line 40, change "$BaZr_{0.8-y}Ce_yY_{0.2-x}Yb_xO_{3-\delta}$, and" to --$BaZr_{0.8-y}Ce_yY_{0.2-x}Yb_xO_{3-\delta}$ and--